United States Patent
Nagar et al.

(10) Patent No.: US 12,265,507 B2
(45) Date of Patent: Apr. 1, 2025

(54) CONTEXTUALLY IRRELEVANT FILE SEGMENTATION

(71) Applicant: International Business Machines Corporation, Armonk, NY (US)

(72) Inventors: Raghuveer Prasad Nagar, Bangalore (IN); Sarbajit K. Rakshit, Kolkata (IN); Manjit Singh Sodhi, Bangalore (IN); Sidharth Ullal, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 17/463,938

(22) Filed: Sep. 1, 2021

(65) Prior Publication Data

US 2023/0067574 A1    Mar. 2, 2023

(51) Int. Cl.

| | |
|---|---|
| *G06F 15/16* | (2006.01) |
| *G06F 16/11* | (2019.01) |
| *G06F 16/14* | (2019.01) |
| *G06F 16/16* | (2019.01) |
| *G06F 16/182* | (2019.01) |
| *G06F 21/60* | (2013.01) |

(52) U.S. Cl.
CPC .......... *G06F 16/182* (2019.01); *G06F 16/122* (2019.01); *G06F 16/148* (2019.01); *G06F 16/164* (2019.01); *G06F 21/602* (2013.01)

(58) Field of Classification Search
None
See application file for complete search history.

(56) References Cited

U.S. PATENT DOCUMENTS

| | | | |
|---|---|---|---|
| 9,348,840 B2 | 5/2016 | Sedayao | |
| 10,264,072 B2 | 4/2019 | Crofton | |
| 10,402,573 B1 | 9/2019 | Galligan | |
| 10,586,063 B2 | 3/2020 | Chang | |
| 2003/0084020 A1* | 5/2003 | Shu | H04L 9/40 |
| 2008/0168135 A1* | 7/2008 | Redlich | G06F 16/282 |
| | | | 709/204 |
| 2010/0229246 A1* | 9/2010 | Warrington | H04L 63/04 |
| | | | 726/28 |
| 2014/0101456 A1* | 4/2014 | Meunier | G06F 40/146 |
| | | | 713/189 |
| 2014/0108617 A1 | 4/2014 | Gerstner | |
| 2014/0201541 A1 | 7/2014 | Paul | |
| 2017/0104736 A1 | 4/2017 | Seul | |

(Continued)

OTHER PUBLICATIONS

Villari et al. Evaluating A File Fragmentation System For Multi-Provider Cloud Storage. Scalable Computing: Practice and Experience, 14:4, pp. 265-277, 2013. (Year: 2013).*

(Continued)

*Primary Examiner* — Alex Gofman
*Assistant Examiner* — Shelly X Qian
(74) *Attorney, Agent, or Firm* — Anthony Curro

(57) ABSTRACT

The present specification describes a computer-implemented method. According to the method, an electronic file to be stored is received and a first context determined for the electronic file. The electronic file is split into multiple segments such that the first context of the electronic file is not discernible from any segment. The multiple segments are then distributed amongst multiple remote storage devices.

20 Claims, 9 Drawing Sheets

(56) References Cited

U.S. PATENT DOCUMENTS

2017/0272209 A1* 9/2017 Yanovsky .......... G06F 12/1466

OTHER PUBLICATIONS

"Full Processor and Detail List"—Document Splitter; Obtained from Internet Jul. 28, 2021; https://cloud.google.com/document-ai/docs/doc-splitter.
"Method for Securing Cloud Storage Via RAID Ordering and Distribution"; Sep. 17, 2014; https:/priorart.ip.com/IPCOM/000238777 (Only Abstract Provided).
Balasaraswathi; Enhanced Security for Multi-Cloud Storage Using Cryptographic Data Splitting with Dynamic Approach; May 8-10, 2014; Abstract Only Provided.
Hassan Saad Alqahtani; "A Multi-Cloud Approach for Secure Data Storage on Smart Device"; Jul. 21-23, 2016; DOI 10.1109/DICTAP. 2016.7544002; https://ieeexplore.ieee.org/document/7544002; Only Abstract Provided.
Madhavan, et al; "Multi Cloud Storage Using Split Algorithm"; IJARCET; vol. 6, Issue 3, Mar. 2017.
Mell; "The NIST Definition of Cloud Computing"; Special Publication 800-145; Sep. 2011.
Sanchez; "Privacy-preserving data outsourcing in the cloud via semantic data splitting"; Sep. 15, 2017.
Thakallapelli; "Real-time Frequency Based Reduced Order Modeling of Large Power Grid"; Power and Energy Society General Meeting; 2016.

* cited by examiner

CONTEXTUALLY IRRELEVANT FILE SEGMENTATION

BACKGROUND

The present invention relates to segmentation of electronic files, and more specifically to the segmentation and distribution of an electronic file in contextually irrelevant segments to different remote storage devices.

SUMMARY

According to an embodiment of the present invention, a computer-implemented method is described. According to the method, an electronic file to be stored is received. The system determines a first context for the electronic file. The electronic file is split into multiple segments such that the first context of the electronic file is not discernible from any segment.

The present specification also describes a system. The system includes a data splitting engine to split an electronic file into multiple segments until a second context of each of the multiple segments is unrelated to a first context of the electronic file. A context determining engine of the system determines the first context of the electronic file and the second context of the multiple segments. A transmit engine of the system, responsive to the first context of the electronic file being unrelated to the second context of the multiple segments, transmits the multiple segments amongst multiple remote storage devices.

The present specification also describes a computer program product. The computer program product includes a computer readable storage medium having program instructions embodied therewith. The program instructions are executable by a processor, to cause the processor to 1) receive, by the processor, an electronic file to be stored, 2) determine, by the processor, that the electronic file is to be split into contextually unrelated segments, and 3) determine, by the processor, a first context for the electronic file to be stored. The program instructions are also executable by the processor to split, by the processor, the electronic file into multiple segments such that the first context of the electronic file is not discernible and unrelated to a second context of any segment and generate, by the processor, a metadata file that comprise instructions to assemble the segments to reconstruct the electronic file. The program instructions are also executable by the processor, to cause the processor to distribute, by the processor, the multiple segments amongst multiple remote storage devices.

DETAILED DESCRIPTION

Figure 1:
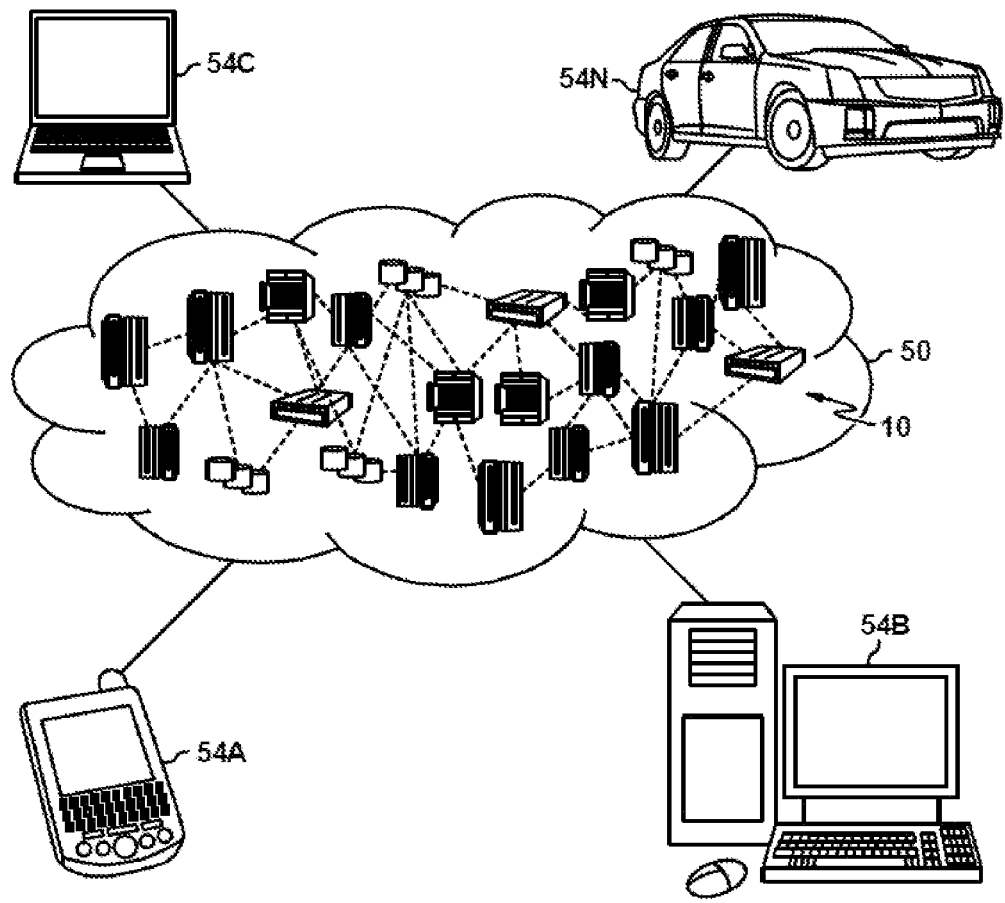
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Data storage is a technological field that is receiving increased attention. This is due to the increased role of electronic devices in day-to-day life. For example, hundreds and thousands of entities store data and communicate with other entities via electronic devices. As such, there may be large amounts of data that are to be stored. As a particular example, a company may maintain a large database of records pertaining to employees, business partners, and/or customers. In some situations, it may be desirable to keep certain data protected, and limit the users who have access rights to that information. Accordingly, the present specification describes a data storage system that efficiently stores data, while also preserving the integrity and security of stored data. Specifically, the present specification describes the segmentation of an electronic file and distribution of the segments to two or more remote storage devices. As such, a single storage device is not relied on to provide data storage capability for the entire data set.

However, while storing data to remote storage devices, an entity may desire to maintain a threshold level of security over stored data. For example, a health database may store medical information for a variety of patients. Were the entire database stored on a single remote storage device, the entire database may be easily retrieved and read by a malicious user. That is, if one remote storage device is hacked, the entire database becomes vulnerable. Accordingly, the present specification describes a system by which certain information can be stored and accessed more securely.

Specifically, the present specification describes systems and methods that divide an electronic file into multiple segments and ensure that a context or content of an electronic file will be undiscernible from any one segment. Specifically, the present systems and methods disclose a system and method to split certain information (which may be confidential) into multiple segments in order to make each segment contextual irrelevant. That is, the system may split the electronic file into a number of contextually irrelevant segments such that each section does not convey any message. Each contextually irrelevant segment is stored on a different remote storage device. When the file is to be retrieved, the contextually irrelevant segments are retrieved and merged from the different remote storage devices to reconstruct and deliver the electronic file. Accordingly, if a malicious user gains unauthorized access to one of the remote storage devices, they will be unable to discern the contents of the entire electronic file. As such, the present systems and methods enhance the security of distributed electronic files.

Such a system, method, and computer program product may 1) provide for distributed storage of electronic files to enhance data security, 2) store electronic file segments such that a context of the segment and electronic file are undiscernible from any one segment, and 3) facilitate reconstruction of an electronic file.

As used in the present specification and in the appended claims, the term "a number of" or similar language is meant to be understood broadly as any positive number including 1 to infinity.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment (50) is depicted. As shown, cloud computing environment (50) includes one or more cloud computing nodes (10) with which local computing devices used by cloud consumers, such as, for example, personal digital assistant (PDA) or cellular telephone (54A), desktop computer (54B), laptop computer (54C), and/or automobile computer system (54N) may communicate. Nodes (10) may communicate with one another. They may be grouped (not shown) physically or virtually, in one or more networks, such as Private, Community, Public, or Hybrid clouds as described hereinabove, or a combination thereof. This allows cloud computing environment (50) to offer infrastructure, platforms and/or software as services for which a cloud consumer does not need to maintain resources on a local computing device. It is understood that the types of computing devices (54A-N) shown in FIG. 1 are intended to be illustrative only and that computing nodes 10 and cloud computing environment 50 can communicate with any type of computerized device over any type of network and/or network addressable connection (e.g., using a web browser).

Figure 2:
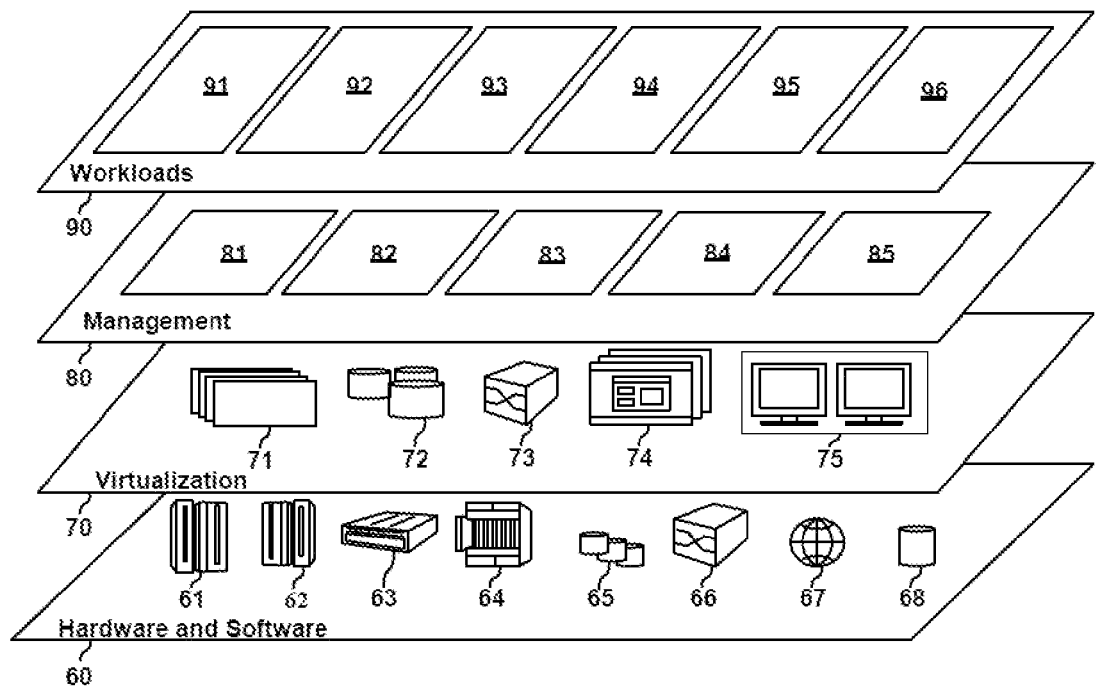
FIG. 2 depicts abstraction model layers according to an embodiment of the present invention.

Referring now to FIG. 2, a set of functional abstraction layers provided by cloud computing environment (50) (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer (60) includes hardware and software components. Examples of hardware components include: mainframes (61); RISC (Reduced Instruction Set Computer) architecture based servers (62); servers (63); blade servers (64); storage devices (65); and networks and networking components (66). In some embodiments, software components include network application server software (67) and database software (68).

Virtualization layer (70) provides an abstraction layer from which the following examples of virtual entities may be provided: virtual servers (71); virtual storage (72); virtual networks (73), including virtual private networks; virtual applications and operating systems (74); and virtual clients (75).

In one example, management layer (80) may provide the functions described below. Resource provisioning (81) provides dynamic procurement of computing resources and other resources that are utilized to perform tasks within the cloud computing environment. Metering and Pricing (82) provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal (83) provides access to the cloud computing environment for consumers and system administrators. Service level management (84) provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer (90) provides examples of functionality for which the cloud computing environment may be utilized. Examples of workloads and functions which may be provided from this layer include: mapping and navigation (91); software development and lifecycle management (92); virtual classroom education delivery (93); data analytics processing (94); transaction processing (95); and electronic file segmentation and storage (96).

Figure 3:
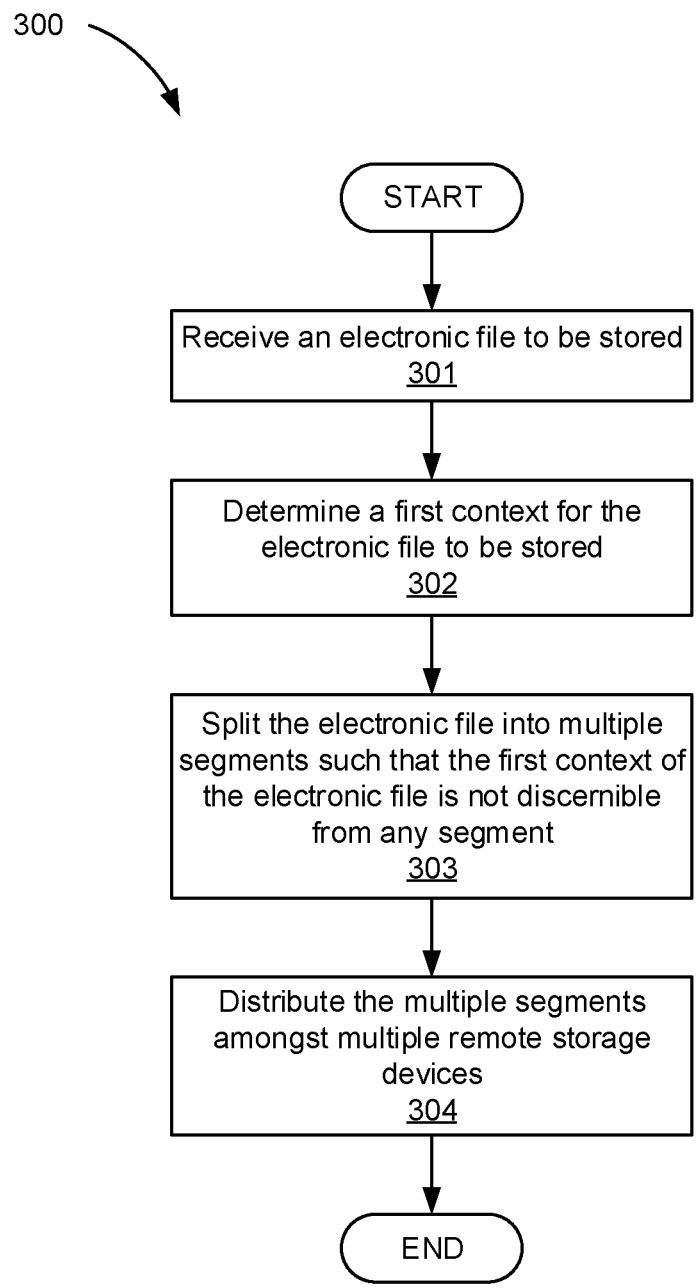
FIG. 3 depicts a computer-implemented method for segmenting a file into contextually irrelevant segments, according to an example of principles described herein.

FIG. 3 depicts a computer-implemented method (300) for segmenting a file into contextually irrelevant segments, according to an example of principles described herein. According to the method (300), an electronic file to be stored is received (block 301) at a computing device. That is, via input from a user, a computing device may receive an electronic file to be stored. The electronic file may be generated by the user on the computing device or may be retrieved from a database. The electronic file may take a variety of forms. For example, the electronic file may be a word processing file, an image file, a video file, or a file having any other digital format.

The computing device then determines (block 302) a first context for the electronic file to be stored. As used in the present specification and in the appended claims the term "first context" refers to a context of the electronic file to be stored. By comparison, the term "second context" refers to a context of the multiple segments of the electronic file. In some examples, the first and second context may be the same, in which case the electronic file is further segmented or re-segmented.

Returning to the method (300). Each electronic file may have a subject. For example, a word processing file may include medical information for a user. As another example, an image file may be an x-ray of a leg of a particular user. As yet another example, a spreadsheet may include municipality expenditures. As such, the computing device may determine (block 302) the first context for the electronic file to be stored, which first context may be indicative of how the electronic file is to be distributed across remote storage devices. As a particular example, the computing device may determine whether the electronic file has a context, i.e.,  includes information, that a user or entity would want to maintain confidential. As such, the system may segment this confidential information into contextually irrelevant segments.

In an example, the component of the computing device that determines context may be a natural language processing system. That is, a word processing file may include text that may be analyzed by a natural language processing system to determine a context, or subject, of the word processing file. As a particular example, the natural language processing system may be a Naïve Bayes system to determine a context/summary of text of a word processing file. In another example, a convoluted neural network (CNN) may be used to determine a context of data. a CNN may be used to contextualize visual data. That is, a CNN may be used to identify keypoints in an image and compare it to a database of images to determine the subject matter of the image.

In a particular example, the method (300) may include determining a security context of the electronic file, which security context may trigger contextually irrelevant segmentation. As a particular example, a support vector machine (SVM) context determining engine may determine if the electronic file includes information intended to be secure. For example, a first electronic file may include a textual description of a public works project while a second electronic file may include a municipality budget. In this example, the SVM context determining engine may identify the text data of the public works project and the numeric data of the municipality budget. Based on this distinction, the SVM may determine that the numeric data representing the municipality budget should be kept secure while the text description of the public works project is public information and therefore not subject to the same security protocols.

As another example, a CNN context determining engine may receive an image and could classify the image based on whether its medical, entertainment, or relates to some other subject. Based on that classification, a security score may dictate how and whether to perform contextually irrelevant segmentation of the image.

In another example, a confidentiality or security level for the electronic file may be determined based on security rules. For example, electronic files may have metadata indicating security features. Examples of this metadata include access right restrictions, password protection, or metadata fields that indicate a security level for the document. In this example, the context determining engine may mine this or other metadata to identify the first context and security level of the electronic file to be stored. In any example, a context determining engine, which may include a machine-learning system, may determine (block 302) a first context for the electronic file, and from the context can determine confidentiality.

Based on the determined first context, a data splitting engine splits (block 303) the electronic file into multiple segments such that the first context of the electronic file is not discernible from any segment. As described above, an electronic file may have a particular context. To prevent a malicious user from ascertaining the context of that electronic file, the present method (300) splits the file into different segments and ensures that the context, i.e., the first context of that electronic file is not discernible from any one segment. As such, the present method (300) ensures the security and integrity of stored data by obfuscating its meaning in each segment into which it is split.

As described below, such a contextually irrelevant splitting (block 303) may be iterative where a split is made, and the context of a segment, i.e., a second context, is determined and compared against the first context of the electronic file. This cycle is repeated until the context of the electronic file, i.e., the first context, is dissimilar and unattainable from each segment. Each subsequent cycle may include re-splitting the electronic file into a different arrangement of segments, or further dividing the segments into a second level. For a text or numeric based electronic file, such a splitting (block 303) may include dividing a document into sections. For an image based electronic file, this may include dividing the picture as a puzzle, performing a pixel shift, etc.

In either case, following splitting (block 303), the system distributes (block 304) the multiple segments amongst multiple remote storage devices. That is, rather than storing the entire electronic file at one location, the electronic file is distributed among multiple locations. Doing so increases security as a security breach at one location does not expose the entire electronic file. Moreover, given the contextually-irrelevant splitting, even if a user were to gain unauthorized access to a segment of the electronic file, they would not be able to ascertain the subject matter of the electronic file.

As such, while storing any document in a multi-device environment, the system ensures that contextually irrelevant data is stored in different locations and merges the data when requested by an authorized user. Moreover, in some examples, the method (300) identifies a desired number of segments to split the electronic file into to make each segment contextually irrelevant.

According to the present method (300) if any remote storage device is hacked, the nefarious user at most receives contextually irrelevant content and will not be able to determine anything relevant with regards to the electronic file at large.

As such, the present method (300) provides for enhanced file security by dividing the data up into contextually irrelevant segments. That is, a file is divided such that a subject matter of the electronic file is indiscernible from any given segment.

Figure 4:
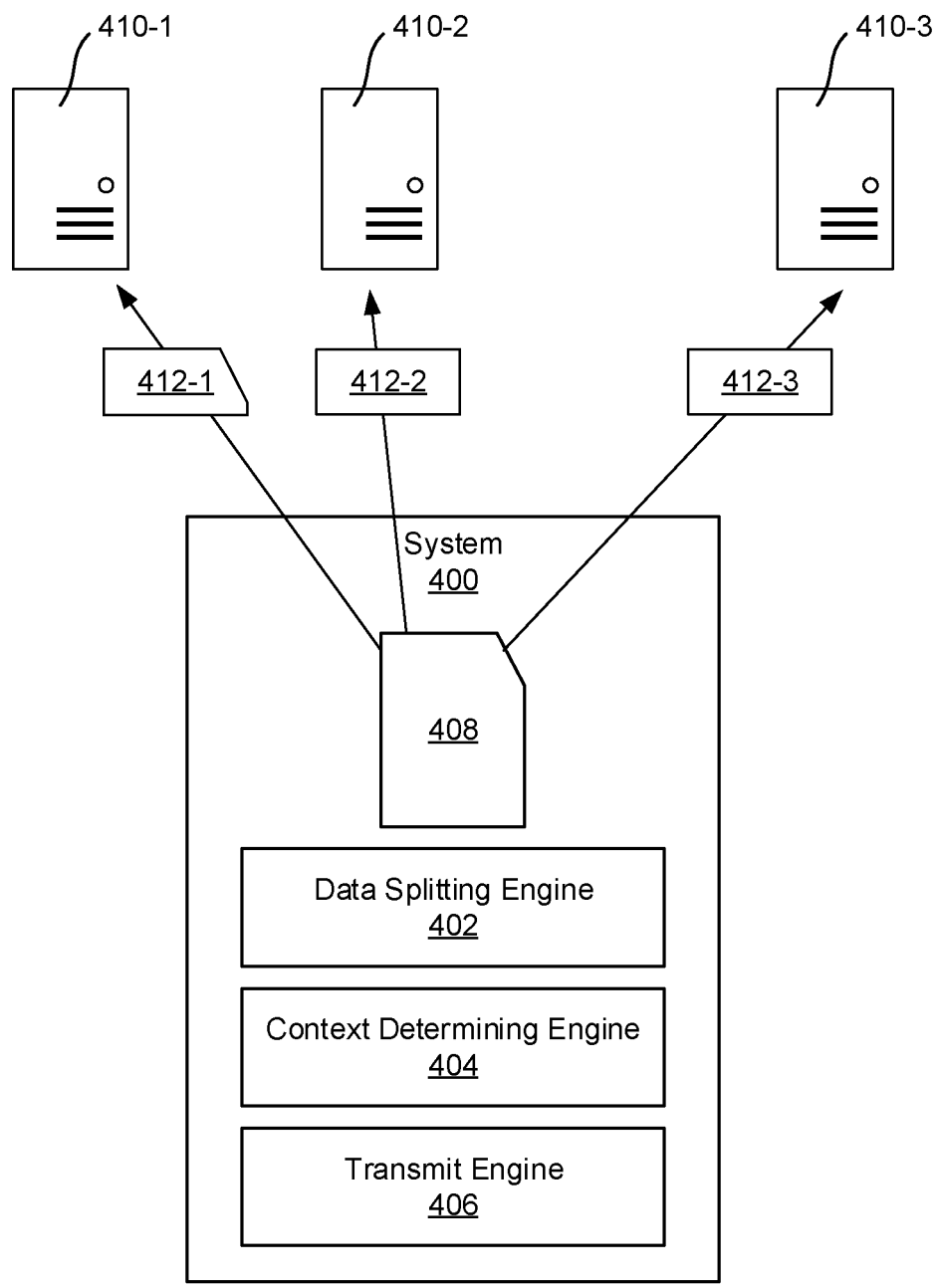
FIG. 4 depicts a system for segmenting a file into contextually irrelevant segments, according to an example of the principles described herein.

FIG. 4 depicts a system (400) for segmenting a file (408) into contextually irrelevant segments (412-1, 412-2, 412-3), according to an example of the principles described herein. To achieve its desired functionality, the system (400) includes various components. Each component may include a combination of hardware and program instructions to perform a designated function. The components may be hardware. For example, the components may be implemented in the form of electronic circuitry (e.g., hardware). Each of the components may include a processor to execute the designated function of the component. Each of the components may include its own processor, but one processor may be used by all the components. For example, each of the components may include a processor and memory. In another example, one processor may execute the designated function of each of the components. The processor may include the hardware architecture to retrieve executable code from the memory and execute the executable code. As specific examples, the components as described herein may include computer readable storage medium, computer readable storage medium and a processor, an application specific integrated circuit (ASIC), a semiconductor-based microprocessor, a central processing unit (CPU), and a field-programmable gate array (FPGA), and/or other hardware device.

The memory may include a computer-readable storage medium, which computer-readable storage medium may contain, or store computer usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the processor cause the processor to implement at least the functionality of segmenting an electronic file (408) into contextually irrelevant segments (412) as described below.

The system (400) may include a data splitting engine (402) to split an electronic file (408) into multiple segments (412) until a context of each of the multiple segments (408), that is the second context, is unrelated to a context of the electronic file (408), that is the first context. That is, each electronic file (408) and segment (412) of an electronic file is associated with a topic, context, or content. If the first context of the electronic file (408) is discernible from the second context of a segment (412), the contents of the electronic file which may be confidential, may be revealed. Accordingly, the data splitting engine (402) iteratively splits the electronic file (408) into segments (412). Each iteration being triggered based on an output of a context determining engine (404).

Accordingly, the system (400) includes a context determining engine (404). As described above, the context determining engine (404) may be a natural language processor or a visual analyzer. The context determining engine (404) determines a first context of the electronic file (408) and a second context of each segment (412-1, 412-2, 412-3) following division. If the determined second context of any segment (412) matches the first context of the electronic file (408), a subsequent iteration of data splitting may be triggered. In another example, a subsequent iteration of data splitting may be triggered when the second context of a segment (412) is discernible at all.

In an example, the data splitting engine (402) splits portions of the electronic file that have a target level of security. That is, rather than splitting an entire electronic file, the data splitting engine (402) may split a subset of the electronic file into segments. For example, a document may include data that is subject to a security restriction and other data that is not. Such a determination may be made, for example, by the context determining engine (404), via user input or any variety of metadata. Based on this determination, the data splitting engine (402) may split the portion of the document subject to the security restriction into contextually irrelevant segments while the portion that is not subject to a security restriction is kept together.

Put another way, the context determining engine (404) may identify a secure portion (Example: numbers in financial report) of the electronic file (408) and then the data splitting engine (402) may split just the secure portions. In such cases, along with machine learning, NLP and image analysis may be used for identification of secure information. In this example, once an electronic file (408) portion is deemed to not require contextually irrelevant splitting, the system (400) may store the portion another way, for example by encrypting this portion.

Following segmentation of the electronic file (408) a transmit engine (406) of the system (400) may transmit the multiple segments (412) amongst multiple remote storage devices (410). Specifically, once the data splitting engine (402) and context determining engine (404) have cooperatively divided the electronic file (408) into segments (412) for which the second context is undiscernible and/or from which the first context of the electronic file (408) is undiscernible, the transmit engine (406) may distribute the contextually irrelevant segments (412) to different remote storage devices (410). For example, a first segment (412-1) may be sent to a first remote storage device (410-1), a second segment (412-2) may be sent to a second remote storage device (410-2), and a third segment (412-3) may be sent to a third remote storage device (410-3). As such, the electronic file security is enhanced 1) as the electronic file (408) is distributed as segments (412) across multiple remote storage devices (410) thus preventing a malicious user from accessing all the segments (412) and 2) by dividing each segment (412) such that no context of the segment (412) and electronic file (408) is discernible from the segment (412).

Figure 5A:
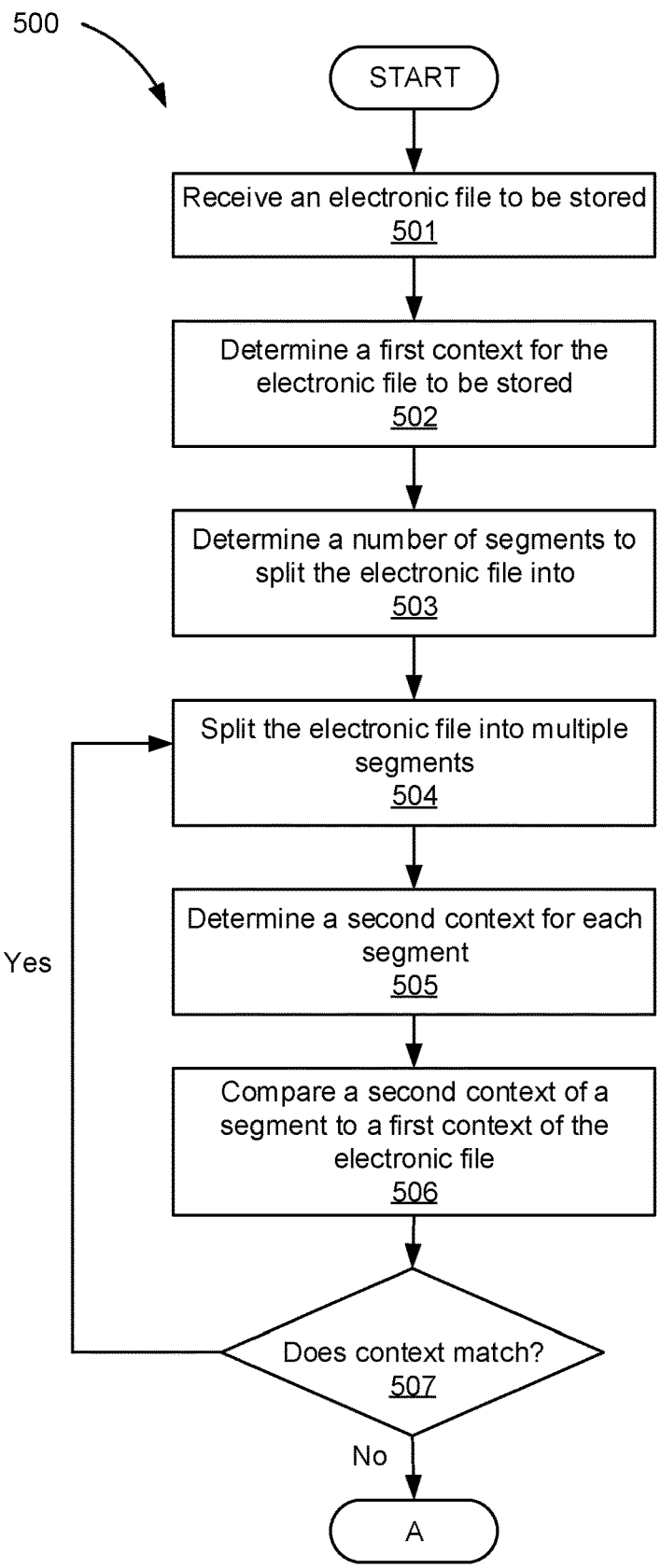
FIGS. 5A and 5B depict a computer-implemented method for segmenting a file into contextually irrelevant segments, according to an example of principles described herein.
Figure 5B:
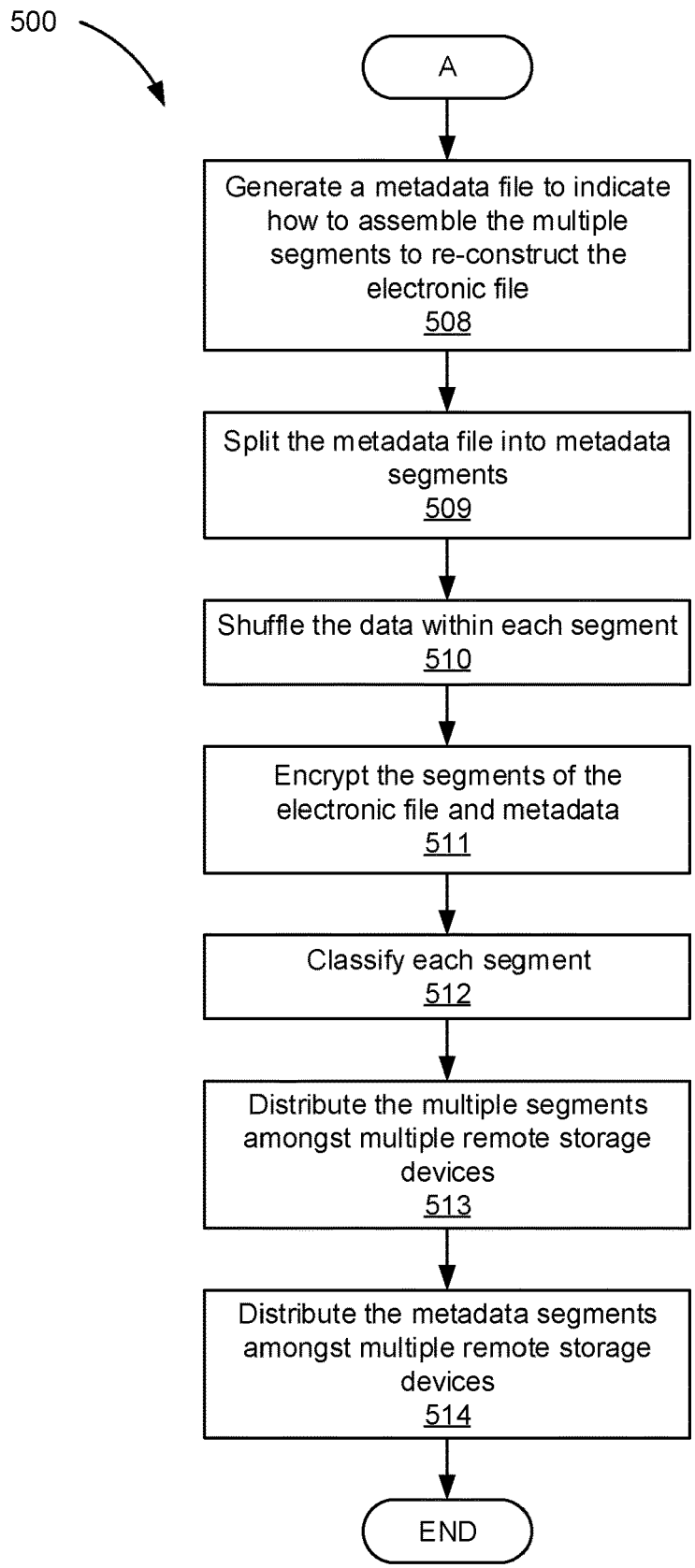

FIGS. 5A and 5B depict a computer-implemented method (500) for segmenting a file (FIG. 4, 408) into contextually irrelevant segments (FIG. 4, 412), according to an example of principles described herein. As described above, the system (FIG. 4, 400) may receive (block 501) an electronic file (FIG. 4, 408) to be stored and a context determining engine (FIG. 4, 404) may determine a first context for the electronic file (FIG. 4, 408). That is, upon receiving an electronic file (FIG. 4, 408) to be stored, the context determining engine (FIG. 4, 404) may classify the file based on metadata as well as its contents. These operations may be performed as described above in connection with FIG. 3.

In an example, the method (500) includes determining (block 503) a number of segments (FIG. 4, 412) to split the electronic file (FIG. 4, 408) into. That is, the data splitting engine (FIG. 4, 402) may be performing natural language processing or other data analysis of the electronic file (FIG. 4, 408) and may identify how the electronic file (FIG. 4, 408) is to be split (e.g., splitting an image, splitting any specific keyword, spoken content, or frame wise splitting etc.), number of segments (FIG. 4, 412) to split the data into, and how the split portions can be shuffled to make each segment (FIG. 4, 412) of the electronic file (FIG. 4, 408) contextually irrelevant. In an example, the number of segments (FIG. 4, 412) that an electronic file (FIG. 4, 408) is to be divided into may be based on any number of factors.

As a first example, the number of segments (FIG. 4, 412) to split the electronic file (FIG. 4, 408) into may be based on an electronic file (FIG. 4, 408) type. For example, the data splitting engine (FIG. 4, 402) may split a spreadsheet file into a first number of segments (FIG. 4, 412) while a zipped file may be split into a second, and larger, number of segments (FIG. 4, 412).

In another example, the data splitting engine (FIG. 4, 402) may split the electronic file (FIG. 4, 408) into segments based on a size of the electronic file (FIG. 4, 408) and/or a desired size for each segment (FIG. 4, 412). For example, a target segment size may be 1 megabyte such that the electronic file (FIG. 4, 408) is split into 1-megabyte chunks.

As another example, the segmentation may be based on a number of remote storage devices (FIG. 4, 410). For example, the electronic file (FIG. 4, 408) may be split into a least double the number of remote storage devices (FIG. 4, 410) such that each remote storage device (FIG. 4, 410) has at least two segments (FIG. 4, 412).

As another example, the number of segments can be determined dynamically based on the contents of the electronic file (FIG. 4, 408). As an example, a word processing document with a flow chart of employee benefit distributions may be divided into two segments (FIG. 4, 412). As another example, the number of segments (FIG. 4, 412) may be determined (block 503) based on a subscription agreement related to the remote storage devices (FIG. 4, 410). For example, if there are five remote storage devices (FIG. 4, 410) and one is reserved for media storage, the electronic file (FIG. 4, 408) may be split into four segments (FIG. 4, 412).

As another example, a network speed may be criteria by which the number of segments (FIG. 4, 412) is defined. As yet another example, historical information relating to electronic file (FIG. 4, 408) breach may be used. For example, it may be the case that contextual irrelevancy is not possible when the electronic file (FIG. 4, 408) is divided into four segments (FIG. 4, 412) and a malicious user obtained the contents of the electronic file (FIG. 4, 408) by gaining unauthorized access to one of the segments (FIG. 4, 412). Accordingly, based on this historical information, a subsequently divided electronic file (FIG. 4, 408) may be split into five or more segments (FIG. 4, 412).

In yet another example, the number of segments (FIG. 4, 412) may be defined by the level of security of the electronic file (FIG. 4, 408), a target level of security, or a security characteristic of the electronic file (FIG. 4, 408). For example, files marked as "confidential" may be split into ten segments (FIG. 4, 412) while non-confidential electronic files (FIG. 4, 408) may be divided into five segments (FIG. 4, 412). As described above, whether the electronic file (FIG. 4, 408) being stored is confidential may be determined based on manual input or may be determined automatically through machine learning, based on features like directory structure. For example, an electronic file (FIG. 4, 408) with a directory having financial or compensation documents may be marked as confidential such that it should be divided into more segments (FIG. 4, 412).

In some examples, an electronic file (FIG. 4, 408) may include multiple data types such as multimedia files. In an example, the system (FIG. 4, 400) may split the electronic file (FIG. 4, 408) such that similar data types are not within the same segment (FIG. 4, 412). For example, the context determining engine (FIG. 4, 404) may determine data types associated with the electronic file (FIG. 4, 408) and the data splitting engine (FIG. 4, 402) may split the electronic file (FIG. 4, 408) such that similar data types are included in different segments (FIG. 4, 412) to be distributed to different remote storage devices (FIG. 4, 410).

In an example, the number of segments (FIG. 4, 412) is determined by a constantly updating machine learning model based on search speed, write speed, and reported security breaches. Search and write speeds may be based on user reported service level agreements whereas security breaches may be identified when a system has successfully reconstituted the electronic file (FIG. 4, 408) from the segments (FIG. 4, 412) stored across various cloud providers.

According to the method (500), the electronic file (FIG. 4, 408) is split (block 504) into multiple segments (FIG. 4, 412). This may be performed as described above in connection with FIG. 3. As described above, the splitting (block 504) of the electronic file (FIG. 4, 408) into multiple segments (FIG. 4, 412) may be iterative. That is, once the electronic file (FIG. 4, 408) is split into segments (FIG. 4, 412), the context determining engine (FIG. 4, 404) may determine (block 505) a second context for each of the multiple segments (FIG. 4, 412) and compare (block 506) the second context for each of the multiple segments (FIG. 4, 412) to the first context for the electronic file (FIG. 4, 408). The determination of the second context of the segments (FIG. 4, 412) may be performed in a manner similar to the determination of the first context of the electronic file (FIG. 4, 408) for example by natural language processing. The context determining engine (FIG. 4, 404) determines if the context match (block 507). Responsive to the second context for a segment (FIG. 4, 412) matching the first context for the electronic file (FIG. 4, 408) (block 507, determination YES), the method (400) includes re-splitting (block 504), or further splitting, the electronic file (FIG. 4, 408) into multiple segments (FIG. 4, 412), determining (block 505) a new second context for each of the re-split segments (FIG. 4, 412), and again comparing (block 506) the second context for each of the re-split multiple segments (FIG. 4, 412) to the first context of the electronic file (FIG. 4, 408). This process is cycled until the second context of each segment (FIG. 4, 412) does not match (block 507, determination NO) the first context of the electronic file (FIG. 4, 408). That is, the system (FIG. 4, 400) may try to re-identify individual segments (FIG. 4, 412) to ensure that the segment (FIG. 4, 412) is unintelligible and does not provide any indication of the content of the original electronic file (FIG. 4, 408) when read on its own.

Once the electronic file (FIG. 4, 408) is sufficiently divided such that each segment (FIG. 4, 412) is undiscernible and does not indicate the contents of the electronic file (FIG. 4, 408), the method (500) includes generating (block 508) a metadata file to indicate how to assemble the multiple segments (FIG. 4, 412) to re-construct the electronic file (FIG. 4, 408). That is, upon scrambling, without such a metadata file, the system (FIG. 4, 400) would not know how to re-construct the scrambled sections to form the electronic file (FIG. 4, 408). That is, the system (FIG. 4, 400) may create a metadata sequence of the electronic file (FIG. 4, 408), so that the split segments (FIG. 4, 412) may be reconstructed based on the metadata sequence.

In an example, the metadata file may also be split (block 509) into multiple metadata segments. As with the electronic file (FIG. 4, 408), segmentation of the metadata file may further enhance data security as not only are the electronic files (FIG. 4, 408) separated into an unintelligible order (without the metadata file), the metadata file is also scrambled so as to further protect against malicious users or devices. In this example, the system (FIG. 4, 400) may store a graphical map indicating the relations between the various metadata segments. That is, the graphical map provides instructions for re-assembling the metadata file, which metadata file provide instructions for re-assembling the electronic file (FIG. 4, 408).

In an example, in addition to splitting the electronic file (FIG. 4, 408) into segments (FIG. 4, 412) for which the second context of the segment (FIG. 4, 412) and the first context of the electronic file (FIG. 4, 408) is undiscernible, the system (FIG. 4, 400) may execute other security operations. For example, the system (FIG. 4, 400) may shuffle (block 510) the data within each segment (FIG. 4, 412) and/or encrypt (block 511) the segments of the electronic file (FIG. 4, 408) and/or the metadata segments. In some examples, a subset of the segments (FIG. 4, 412) may be so acted upon. For example, even if the second context of a segment (FIG. 4, 412) as a whole is unintelligible, portions of the data may have properties which make it easier for re-constituting, due to low complexity. Examples include a date or time. For example, a segment (FIG. 4, 412) may include the date Feb. 12, 2017, which may be readily understood as a date. Accordingly, in this example, the system (FIG. 4, 400) may use additional encryption operations such as merging, shuffling, and padding techniques to make the data unintelligible to other systems.

In an example, each segment (FIG. 4, 412) may be classified (block 512) and distributed (block 513) based on a segment classification. Specifically, based on the classification, particular segments (FIG. 4, 412) may be provided to a predetermined remote storage device (FIG. 4, 410). That is, different remote storage devices (FIG. 4, 410) may have different characteristics which bear on the amount of security they can provide. As a particular example, a remote storage device (FIG. 4, 410) on a public network may be more susceptible to security breaches than a remote storage device (FIG. 4, 410) on a private network. Accordingly, in this example, electronic files (FIG. 4, 408) and segments (FIG. 4, 412) which are desired to be more secure may be stored on a remote storage device (FIG. 4, 412) on a private network which may offer more security. By comparison, electronic files (FIG. 4, 408) and segments (FIG. 4, 412) which trigger lighter security measures may be provided to a remote storage device (FIG. 4, 412) on a public network which may not provide the same security, but may provide decreased decryption time and may be a more cost-effective solution for the electronic file storage.

As such, the transmit engine (FIG. 4, 406) distributes (block 513) the multiple segments (FIG. 4, 412) amongst the multiple remote storage devices (FIG. 4, 410). This may be performed as described above in connection with FIG. 3. Similarly, the transmit engine (FIG. 4, 406) may distribute (block 514) the metadata segments amongst the multiple remote storage devices (FIG. 4, 410).

As described above, the method (500) may be continuously performed. Also, over time the security level of a particular electronic file (FIG. 4, 408) may change. For example, a document relating to an upcoming public service project may initially have a high degree of desired security to prevent the plans from leaking to the public. However, after a press release regarding the project, the document may no longer be targeted for secure storage. In such cases, the system (FIG. 4, 400) may alter a splitting parameter of the electronic file (FIG. 4, 408) based on a change to a security characteristic of the electronic file (FIG. 4, 408). For example, the metadata or other identifying information associated with the electronic file (FIG. 4, 408) may be updated to reflect the change in the security status. As this metadata may be used to identify the splitting arrangement, the change to the metadata would alter the splitting arrangement.

Note that the above-described method (500) may be performed on structured and unstructured data. Unstructured data refers to data which does not have a defined form, such as text generated in a word processing program. Structured data by comparison has a defined form. For example, data cells in a spreadsheet application. In the case of structured data, the context determining engine (FIG. 4, 404) may be a data analytics application that determines the context of the structured data. In the case of unstructured data, the context determining engine (FIG. 4, 404) may be a natural language processor as described above.

A specific example of electronic file (FIG. 4, 408) segmentation is now provided. In this example, a system (FIG. 4, 400) may be implemented in a human resources department of an organization. In this example, the electronic file (FIG. 4, 408) to be segmented may be a word document with information relating to employee compensation, skill development, marketing, and leaves and is to be distributed to worldwide human resources team members. In this example, the document may include text, tables, and images. Certain portions of the document may have a target level of security due to the information contained therein. As such, the context determining engine (FIG. 4, 404) which may include a natural language processor and other data and metadata analytic systems may analyze the document to identify the document as one for which an increased amount of security is desired.

In this example, the data splitting engine (FIG. 4, 402) splits the document into multiple segments based on the number of available remote storage devices (FIG. 4, 410). Specifically, the document may be split into a number of segments (FIG. 4, 412) equal to the number of available remote storage devices (FIG. 4, 410) times N, where N may be one or more and may be user selectable. Following splitting by the data splitting engine (FIG. 4, 402), the context determining engine (FIG. 4, 404) derives the second context of each segment (FIG. 4, 412) and compares it with the first context of the human resources document. If the context of any segment (FIG. 4, 412) matches the context of the human resources document, the data splitting engine (FIG. 4, 402) and the context determining engine (FIG. 4, 404) continue to interoperate until second contexts of the segments (FIG. 4, 412) do not match the first context of the human resources document.

With the system (FIG. 4, 400) having derived the contextually irrelevant segments (FIG. 4, 412), the transmit engine (FIG. 4, 406) assigns each segment (FIG. 4, 412) to a remote storage device (FIG. 4, 410), and the data splitting engine (FIG. 4, 402) creates a metadata file to indicate where each segment is stored amongst the multiple remote storage devices (FIG. 4, 410).

Figure 6:
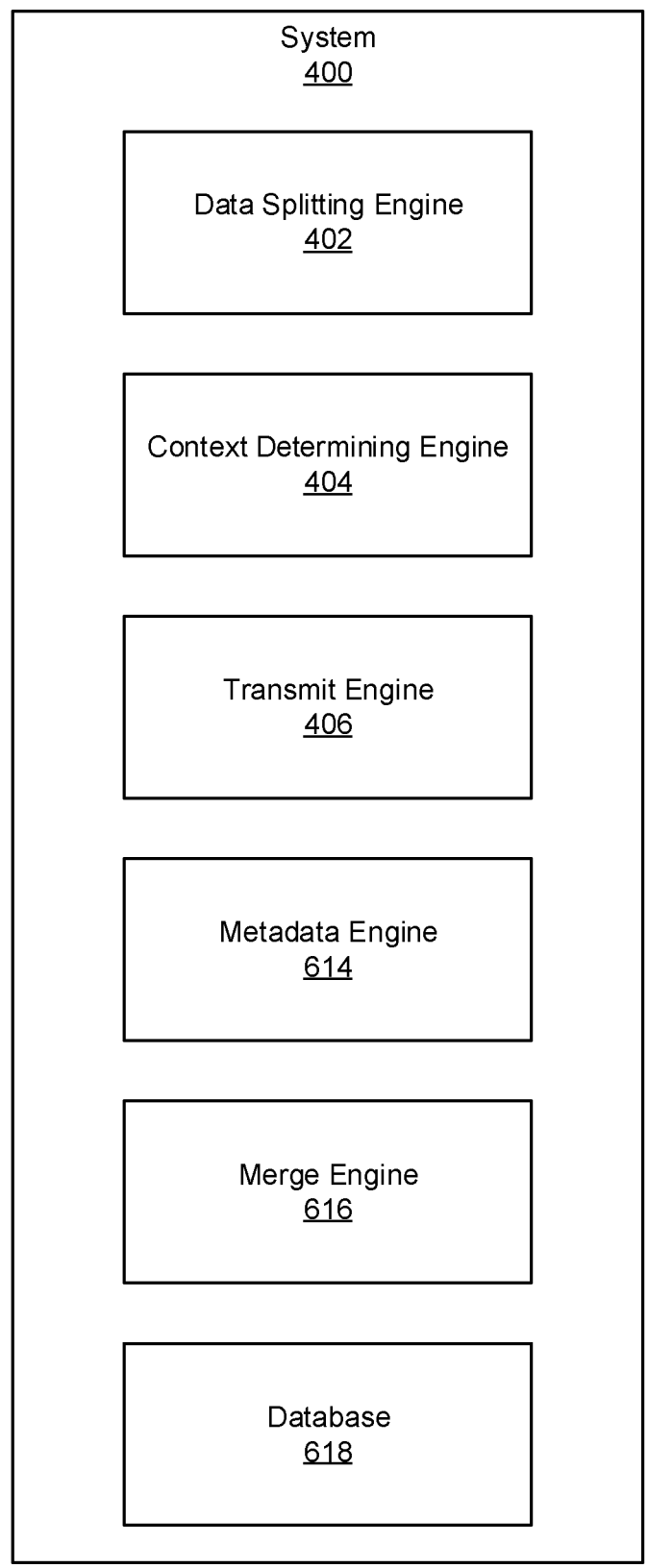
FIG. 6 depicts a system for segmenting a file into contextually irrelevant segments, according to an example of the principles described herein.

FIG. 6 depicts a system (400) for segmenting a file (FIG. 4, 408) into contextually irrelevant segments (FIG. 4, 412), according to an example of the principles described herein. In the example depicted in FIG. 6, the system (400) includes the data splitting engine (402), context determining engine (404), and transmit engine (406) as described above. In other examples, the system (400) includes additional components.

For example, the system (400) may include a metadata engine (614) to generate the metadata file which is to indicate how the segments are to be assembled to reconstruct the electronic file (FIG. 4, 408). As described above, the data splitting engine (402) may split the metadata file into multiple metadata segments and the transmit engine (406) may transmit the multiple metadata segments amongst the multiple remote storage devices (FIG. 4, 410).

The system (400) may also include a merge engine (616) to, responsive to a request to read the electronic file (FIG. 4, 408), compile the multiple segments (FIG. 4, 412). That is, upon a request received at the system (400) to read the electronic file (FIG. 4, 408), the merge engine (616) may compile multiple metadata segments from the different remote storage devices (FIG. 4, 410). Based on the retrieved metadata, the electronic file segments (FIG. 4, 412) may be retrieved in sequence and the electronic file (FIG. 4, 408) may be reconstructed. That is, the merge engine (616) first fetches the metadata segments from the various remote storage devices (FIG. 4, 410) and unscrambles them. Using the metadata, the merge engine (616) identifies the file segments (FIG. 4, 412), unscrambles them, and re-constitutes the electronic file (FIG. 4, 408) which is provided as an output to an electronic device.

As described above, it may be the case that the metadata file itself is divided into metadata segments. In this example, the system (400) may include a database (618) which database (618) stores a graphical map to indicate how the metadata segments are to be assembled. This graphical map may be used by the merge engine (616) in compiling the metadata file.

Figure 7:
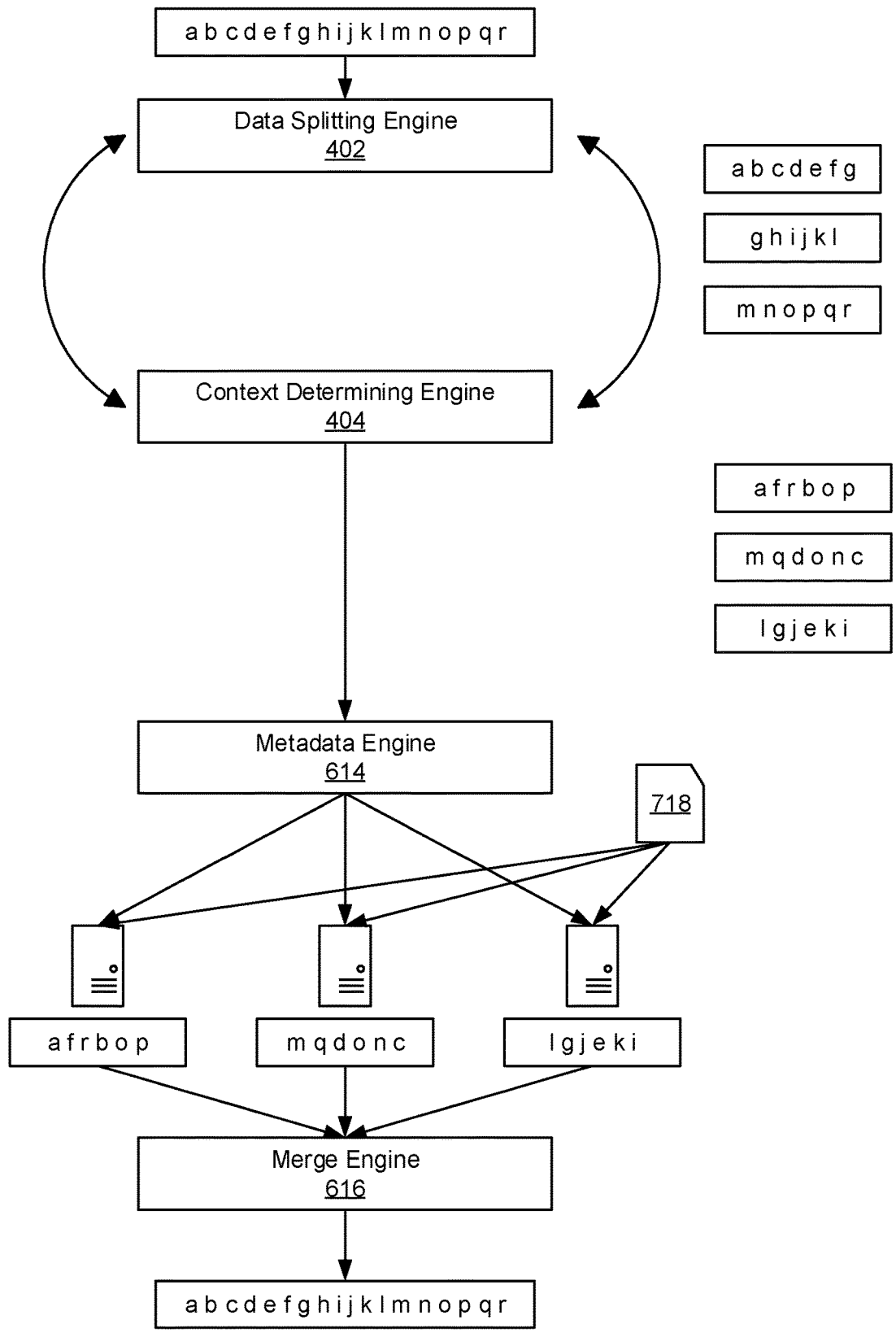
FIG. 7 depicts a file segmented into contextually irrelevant segments and reconstructed, according to an example of the principles described herein.

FIG. 7 depicts an electronic file (FIG. 4, 408) segmented into contextually irrelevant segments (FIG. 4, 412) and reconstruction of the electronic file (FIG. 4, 408), according to an example of the principles described herein. That is, FIG. 7 depicts how the system (FIG. 4, 400) splits an electronic file (FIG. 4, 408) into multiple segments (FIG. 4, 412) and ensures that each segment (FIG. 4, 412) is contextually irrelevant. FIG. 7 also depicts how the system (FIG. 4, 400) creates the metadata file (720) to ensure proper reconstructing. As described above, each segment (FIG. 4, 412) may be on different remote storage devices (FIG. 4, 410) so that no single remote storage device (FIG. 4, 410) stores all the data. As such, a nefarious entity will not be able to reconstitute the original electronic file (FIG. 4, 408).

As described above, the electronic file (FIG. 4, 408) may be of a variety of types including a video, spread sheet, word processing document or others. In the example depicted in FIG. 7, the electronic file (FIG. 4, 408) has an original data structure represented in FIG. 7 as "a b c d e f g h i j k l m n o p q r" for ease of illustration. In this example, the data splitting engine (402) initially divides the electronic file (FIG. 4, 408) into multiple segments (FIG. 4, 412). While FIG. 7 depicts three segments (FIG. 4, 412) with the data structures, "a b c d e f g," "g h i j k l," and "m n o p q r," the data splitting engine (402) may split the electronic file (FIG. 4, 408) into thousands of different segments (FIG. 4, 412). As a particular example, multiple segments of audio may be extracted from a video, and image frames of the video may be split into groups, and the textual sections of a file may be formed as well.

As described above, the data splitting engine (402) and the context determining engine (404) may interoperate until contextually irrelevant data segments (FIG. 4, 412) are generated, which in FIG. 7 have the data structures of "a f r b o p," "m q d on c," and "l g j e k i." In some examples, these contextually irrelevant data segments (FIG. 4, 412) may be further encrypted to enhanced data security. That is, in this example, the data segments are re-split into new segments.

The data splitting engine (402) also generates a metadata file (718) that includes electronic file (FIG. 4, 408) assembly instructions. That is, the system (400) splits the electronic file (FIG. 4, 408) using different techniques. Once split, each of the segments (FIG. 4, 412) may have metadata, which metadata may be segmented. Like the segments (FIG. 4, 412), the metadata segments, the metadata segments may be encrypted and stored in different remote storage devices (FIG. 4, 410).

Once a request to retrieve the electronic file (FIG. 4, 408) is received, the merge engine (616) collects and/or assembles the metadata file (718) and uses it as a blueprint for assembling the electronic file (FIG. 4, 408). As such, the original electronic file (FIG. 4, 408), having the data structure "a b c d e f g h i j k l m n o p q r" is provided as an output.

Another specific example is now provided. In this example, the system (FIG. 4, 400) receives an email to be sent out from a president of an organization. The email includes a password protected document detailing a plan and timing for an announcement from the president. In this example, the document may include the words, "the president will announce a new economic policy on 30th September at 12 AM." In this example, the context determining engine (404) may determine, based on the password protected feature of the document, that this document is to be provided with enhanced security.

Following a first iteration by the data splitting engine (402), the segments (FIG. 4, 412) may be as follows:
  a. Segment 1—will new policy 30th
  b. Segment 2—The announce economic September
  c. Segment 3—president a on at 12 AM From this, the context determining engine (404) may determine that a second context of each segment (FIG. 4, 408) as well as a first context of the electronic file (FIG. 4, 412) is still discernible and/or related. Accordingly, the data splitting engine (402) performs another round of segmentation where the segments (FIG. 4, 412) may be as follows.

a. Segment 1.1—w e po 3
b. Segment 1.2—μl n lic 0t
c. Segment 1.3—w y h
d. Segment 2.1—T noun ec p temb er
e. Segment 2.2—h an mic Se
f. Segment 2.3—h ce ono p er
g. Segment 3.1—p a 12
h. Segment 3.2—reside a on M
i. Segment 3.3—nt a at A In this example, the data splitting engine (402) further splits the initial segments into additional sub-segments. From this, the context determining engine (404) may determine that a second context of each segment (FIG. 4, 408) is not discernible. As such, the metadata engine (614) may generate the associated metadata, and split the metadata if desired, and the transmit engine (406) may pass it to different remote storage devices (FIG. 4, 410) as described above. In this example, where each initial segment is subdivided into sub-segments, the transmit engine (FIG. 4 406) may ensure that no two sub-segments from the same segment are stored in the same remote storage device (FIG. 4, 410) to further enhance security. For example, segment 1.1, 2.1, and 3.1 may be stored to a first remote storage device (FIG. 4, 410-1), while segment 1.2, 2.2, and 3.2 are stored to a second remote storage device (FIG. 4, 410-2), and segment 1.3, 2.3, and 3.3, are stored to a third remote storage device (FIG. 4, 410-3).

Figure 8:
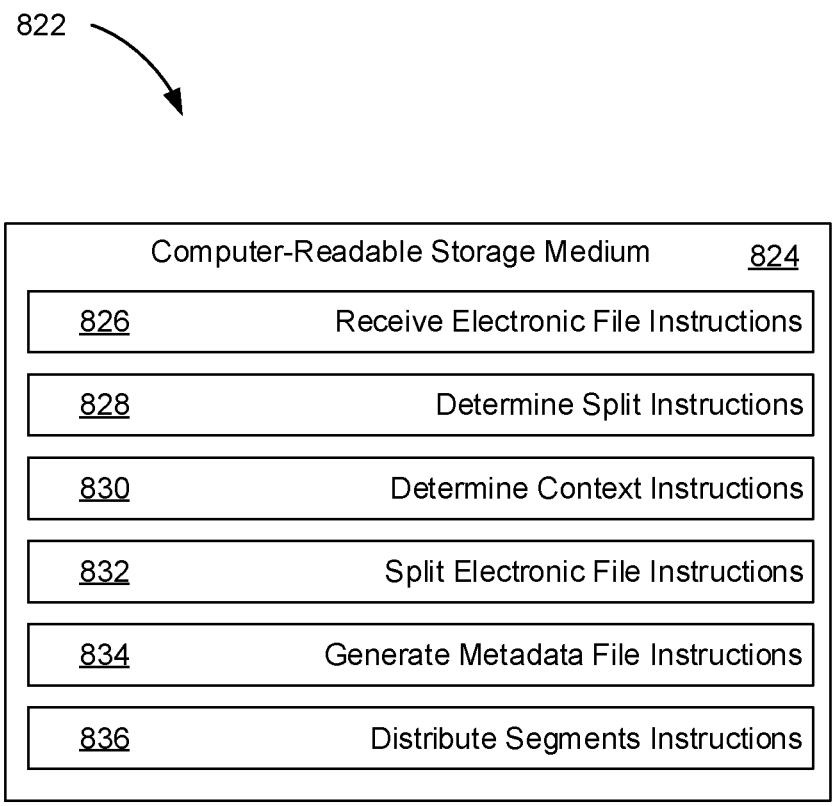
FIG. 8 depicts a computer program product with a computer readable storage medium for segmenting a file into contextually irrelevant segments, according to an example of principles described herein.

FIG. 8 depicts a computer program product (822) with a computer readable storage medium (824) for segmenting a file (FIG. 4, 408) into contextually irrelevant segments (FIG. 4, 412), according to an example of principles described herein. To achieve its desired functionality, the system (FIG. 4, 400) includes various hardware components. Specifically, a computing system includes a processor and a computer-readable storage medium (824). The computer-readable storage medium (824) is communicatively coupled to the processor. The computer-readable storage medium (824) includes a number of instructions (826, 828, 830, 832, 834, 836) for performing a designated function. The computer-readable storage medium (824) causes the processor to execute the designated function of the instructions (826, 828, 830, 832, 834, 836).

Referring to FIG. 8, receive electronic file instructions (826), when executed by the processor, cause the processor to receive, by the processor, an electronic file (FIG. 4, 408) to be stored. Determine split instructions (828), when executed by the processor, may cause the processor to determine, by the processor, that the electronic file (FIG. 4, 408) is to be split into contextually unrelated segments (FIG. 4, 412). Determine context instructions (830), when executed by the processor, may cause the processor to determine, by the processor, a first context for the electronic file (FIG. 4, 408) to be stored. Split electronic file instructions (832), when executed by the processor, may cause the processor to split, by the processor, the electronic file (FIG. 4, 408) into multiple segments (FIG. 4, 412) such that the first context of the electronic file (FIG. 4, 408) is not discernible and unrelated to a second context of any segment (FIG. 4, 412). Generate metadata file instructions (834), when executed by the processor, may cause the processor to generate, by the processor, a metadata file that includes instructions to assemble the segments (FIG. 4, 412) to reconstruct the electronic file (FIG. 4, 408). Distribute segments instructions (836), when executed by the processor, may cause the processor to distribute, by the processor, the multiple segments (FIG. 4, 412) amongst multiple remote storage devices (FIG. 4, 410).

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. In one example, the computer usable program code may be embodied within a computer readable storage medium; the computer readable storage medium being part of the computer program product. In one example, the computer readable storage medium is a non-transitory computer readable medium.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving an electronic file to be stored;
determining a first context for content of the electronic file to be stored, the first context indicating a nature or subject of the content of the electronic file so as to enable a determination of whether the content of the electronic file contains confidential information;
based on the determined first context of the content of the electronic file, determining whether the content of the electronic file contains confidential information;
splitting the electronic file into multiple segments such that the first context of the electronic file is not discernible from any segment;
determining at least one first segment of the segments that is to be more secure than others of the segments;
distributing the multiple segments amongst multiple remote storage devices, wherein the first segment is distributed to a remote storage device on a private network;
generating a metadata file to indicate how to assemble the multiple segments to re-construct the electronic file;
splitting the metadata file indicating how to assemble the multiple segments of the electronic file into multiple metadata segments and distributing the multiple metadata segments amongst the multiple remote storage devices such that a merge engine compiles multiple metadata segments from the multiple remote storage devices to reconstruct the electronic file, wherein splitting the metadata file comprises storing a graphical map indicating relations between different metadata segments to provide instructions for re-assembling the metadata file, the metadata file then providing instructions for re-assembling the electronic file; and
altering a splitting parameter of the electronic file based on a change to a security characteristic of the electronic file, altering the splitting parameter including updating metadata associated with the electronic file, the metadata associated with the electronic file used to identify a splitting arrangement and how to assemble the multiple segments.

2. The computer-implemented method of claim 1, further comprising:
determining a second context for each of the multiple segments; and
comparing the second context for each of the multiple segments to the first context of the electronic file.

3. The computer-implemented method of claim 2, further comprising, responsive to the second context for a segment indicating that the segment contains confidential information:
re-splitting the electronic file into multiple segments;
determining a third context for each of the re-split multiple segments; and
comparing the third context for each of the re-split multiple segments to the first context of the electronic file.

4. The computer-implemented method of claim 1, further comprising using a support vector machine (SVM) or convoluted neural network (CNN) as a context determining engine to determine if the electronic file includes confidential information, wherein the CNN identifies keypoints in an image based on contextualized visual data of the electronic file and compares the image, using those keypoints, to a database of images to determine a subject matter of the image and the electronic file.

5. The computer-implemented method of claim 1, further comprising, determining a number of segments to split the electronic file into, wherein determining a number of segments to split the electronic file into is based on:
an electronic file type;
an electronic file size;
a number of remote storage devices;
contents of the electronic file;
a subscription agreement related to the remote storage devices;
a level of security of the electronic file;
a network speed;
historical information relating to electronic file breach; and
a target level of security.

6. The computer-implemented method of claim 1, further comprising using a support vector machine (SVM) as a context determining engine to determine if the electronic file includes confidential information generating a metadata file to indicate how to assemble the multiple segments to re construct the electronic file.

7. The computer-implemented method of claim 1, further comprising determining a number of segments to split the electronic file into, wherein determining a number of segments to split the electronic file into is based on a number of remote storage devices or a network speed splitting the metadata file into metadata segments; and distributing the metadata segments amongst the multiple remote storage devices.

8. The computer-implemented method of claim 1, further comprising encrypting the segments of the electronic file and the metadata segments.

9. The computer-implemented method of claim 1, further comprising rearranging data within each segment to achieve shuffling of the data within each segment.

10. The computer-implemented method of claim 1, wherein splitting the electronic file into multiple segments comprises:
determining data types associated with the electronic file; and
splitting the electronic file such that similar data types are included in different segments to be distributed to different remote storage devices.

11. The computer-implemented method of claim 1, further comprising:
classifying each segment; and
distributing, based on a segment classification, a segment to a predetermined remote storage device.

12. A system, comprising:
a data splitting engine to split an electronic file into multiple segments until a second context of each of the multiple segments is unrelated to a first context of the electronic file, the first context indicating a nature or subject of the content of the electronic file so as to enable a determination of whether the content of the electronic file contains confidential information;
a context determining engine to determine:
the first context of the electronic file; and
the second context of the multiple segments; and
a transmit engine to, responsive to the first context of the electronic file being unrelated to the second context of the multiple segments, transmit the multiple segments amongst multiple remote storage devices;
the transmit engine to:
generate a metadata file to indicate how to assemble the multiple segments to re-construct the electronic file; and to split the metadata file indicating how to assemble the multiple segments of the electronic file into multiple metadata segments,
distribute the metadata segments amongst the multiple remote storage devices such that a merge engine compiles multiple metadata segments from the multiple remote storage devices to reconstruct the electronic file,
store a graphical map indicating relations between different metadata segments to provide instructions for re-assembling the metadata file, the metadata file then providing instructions for re-assembling the electronic file,
alter a splitting parameter of the electronic file based on a change to the security characteristics of the electronic file, altering the splitting parameter including updating metadata associated with the electronic file, the metadata associated with the electronic file used to identify a splitting arrangement and how to assemble the multiple segments.

13. The system of claim 12, further comprising the merge engine to, responsive to a request to read the electronic file, compile the multiple segments.

14. The system of claim 12, wherein the transmit engine is further to:
determine at least one first segment of the segments that is to be more secure than others of the segments; and
distribute the multiple segments amongst multiple remote storage devices, wherein the first segment is distributed to a remote storage device on a private network.

15. The system of claim 12, wherein the data splitting engine is to split portions of the electronic file that have a target level of security and alter a splitting parameter of the electronic file based on a change to a security characteristic of the electronic file.

16. The system of claim 12, wherein the context determining engine is a natural language processor.

17. The system of claim 12, wherein the data splitting engine is to split the electronic file into multiple segments such that a second context of each of the multiple segments is:
   dissimilar from the first context of the electronic file; and
   undiscernible.

18. A computer program product, the computer program product comprising a computer readable storage medium having program instructions embodied therewith, the program instructions executable by a processor, to cause the processor to:
   receive, by the processor, an electronic file to be stored;
   determine, by the processor, that the electronic file is to be split into contextually unrelated segments;
   determine, by the processor, a first context for the electronic file to be stored, the first context indicating a nature or subject of content of the electronic file so as to enable a determination of whether the content of the electronic file contains confidential information and a security level of the electronic file based on the confidential information;
   split, by the processor, the electronic file into multiple segments such that the first context of the electronic file is not discernible and unrelated to a second context of any segment;
   generate, by the processor, a metadata file that comprise instructions to assemble the segments to reconstruct the electronic file;
   splitting the metadata file indicating how to assemble the multiple segments of the electronic file into multiple metadata segments and distributing the multiple metadata segments amongst multiple remote storage devices such that a merge engine compiles multiple metadata segments from the multiple remote storage devices to reconstruct the electronic file, wherein splitting the metadata comprise storing a graphical map indicating relations between different metadata segments to provide instructions for re-assembling the metadata file, the metadata file then providing instructions for re-assembling the electronic file;
   distribute, by the processor, the multiple segments and metadata segments amongst multiple remote storage devices; and
   alter a splitting parameter of the electronic file based on a change to a security characteristic of the electronic file, altering the splitting parameter including updating metadata associated with the electronic file, the metadata associated with the electronic file used to identify a splitting arrangement and how to assemble the multiple segments.

19. The computer program product of claim 18, further comprising using metadata of the electronic file in determining the security level of the electronic file and whether, by the processor, that the electronic file is to be split into contextually unrelated segments.

20. The computer program of claim 19, further comprising program instructions executable by the processor, to cause the processor to alter a splitting parameter of the electronic file based on a change to a security characteristic of the electronic file.

* * * * *